US011632267B2

(12) United States Patent
Norbutas et al.

(10) Patent No.: US 11,632,267 B2
(45) Date of Patent: Apr. 18, 2023

(54) MULTI-PART TCP CONNECTION OVER VPN

(71) Applicant: 360 IT, UAB, Vilnius (LT)

(72) Inventors: Emanuelis Norbutas, Vilnius (LT);
Tomas Okmanas, Vilnius (LT);
Marijus Briedis, Jurbarkai (LT)

(73) Assignee: 360 IT, UAB, Vilnius (LT)

( * ) Notice: Subject to any disclaimer, the term of this patent is extended or adjusted under 35 U.S.C. 154(b) by 0 days.

(21) Appl. No.: 17/669,535

(22) Filed: Feb. 11, 2022

(65) Prior Publication Data

US 2022/0166647 A1 May 26, 2022

Related U.S. Application Data

(63) Continuation of application No. 17/361,351, filed on Jun. 29, 2021, now Pat. No. 11,394,582, which is a continuation-in-part of application No. 16/780,925, filed on Feb. 4, 2020, now Pat. No. 11,050,587.

(51) Int. Cl.
*H04L 12/46* (2006.01)
*H04L 47/36* (2022.01)

(52) U.S. Cl.
CPC ...... *H04L 12/4641* (2013.01); *H04L 12/4633* (2013.01); *H04L 47/36* (2013.01)

(58) Field of Classification Search
CPC . H04L 12/4641; H04L 12/4633; H04L 47/36; H04L 65/1069
USPC ........................................................ 709/238
See application file for complete search history.

(56) References Cited

U.S. PATENT DOCUMENTS

| 7,006,526 | B1 | 2/2006 | Biederman |
| 7,136,377 | B1 * | 11/2006 | Tweedly ............... H04L 65/765 |
| | | | 370/473 |
| 7,394,788 | B2 | 7/2008 | Kim et al. |
| 8,605,590 | B2 | 12/2013 | Sivakumar et al. |
| 9,641,650 | B2 | 5/2017 | Virkki et al. |

(Continued)

OTHER PUBLICATIONS

What is MSS (Maximum Segment Size) and how it is Calculated? IBM Jun. 17, 2018 (Year 2018).

(Continued)

*Primary Examiner* — Tan Doan
(74) *Attorney, Agent, or Firm* — Young Basile Hanlon & MacFarlane, P.C.

(57) ABSTRACT

An encrypted tunnel is established between a virtual private network (VPN) server and a VPN user device. A request to establish a connection with a target device is received from the VPN user device. The request uses initial connection parameters. The connection the converted into a first connection between the VPN user device and the VPN server and a second connection between the VPN server and the target device. The first connection uses first connection parameters and the second connection uses second connection parameters. At least one parameter of the first connection parameters or of the second connection parameters is different from a corresponding parameter of the initial connection parameters. First network packets received from the VPN user device according to the first connection parameters are converted into second network packets according to the second connection parameters. The second network packets are transmitted to the target device.

20 Claims, 6 Drawing Sheets

(56) References Cited

U.S. PATENT DOCUMENTS

| | | | |
|---|---|---|---|
| 2003/0191843 A1* | 10/2003 | Balissat | H04L 63/0281 |
| | | | 709/227 |
| 2008/0107026 A1 | 5/2008 | Backman | |
| 2012/0243410 A1* | 9/2012 | Vedula | H04L 63/0272 |
| | | | 370/235 |
| 2012/0281559 A1* | 11/2012 | Ner | H04W 28/06 |
| | | | 370/252 |
| 2013/0322255 A1* | 12/2013 | Dillon | H04L 12/2867 |
| | | | 370/236 |
| 2014/0181267 A1 | 6/2014 | Wadkins et al. | |
| 2015/0350160 A1* | 12/2015 | Nathan | H04L 67/52 |
| | | | 726/14 |
| 2016/0057067 A1* | 2/2016 | Jagadish | H04L 69/326 |
| | | | 370/230 |
| 2016/0057070 A1 | 2/2016 | Saxena et al. | |
| 2017/0070533 A1 | 3/2017 | Bailey et al. | |
| 2017/0237735 A1 | 8/2017 | Johnson et al. | |

OTHER PUBLICATIONS

International Search Report on application No. PCT/US2019/055109 dated Jan. 22, 2020.

\* cited by examiner

MULTI-PART TCP CONNECTION OVER VPN

CROSS-REFERENCE TO RELATED APPLICATION

This application is a continuation of U.S. application Ser. No. 17/361,351, filed on Jun. 29, 2021, which is a continuation of U.S. application Ser. No. 16/780,925, filed on Feb. 4, 2020, the entire disclosures of which are incorporated herein by reference.

FIELD

The present invention relates to virtual private networks (VPNs), and more particularly to a method and system of optimizing Transport Control Protocol (TCP) performance during a VPN connection by way of splitting the connection at the transport layer. The disclosed methods, applications and devices implement an optimization that compensates for VPN encapsulation overhead during TCP packet construction.

BACKGROUND

VPN stands for Virtual Private Network (VPN), a technology that allows a network entity to connect to a private network over a public network. Traditionally the main function of VPN has been to allow for a roaming customer, or a distant office connected to a public network, to connect to a private network for accessing the resources within e.g., business applications within a corporate LAN.

VPN technology was developed to allow remote users and branch offices to access corporate applications and resources. To ensure security, the private network connection is established using an encrypted layered tunneling protocol and VPN users use authentication methods, including passwords or certificates, to gain access to the VPN. In other applications, Internet users may secure their connections with a VPN, to circumvent geo-restrictions and censorship, or to connect to proxy servers to protect personal identity and location to stay anonymous on the Internet.

The possible classification of VPNs may be based on the tunneling protocol used, the tunnel's termination point location, e.g., on the customer edge or network-provider edge, the topology of connections, such as site-to-site or user remote access, the levels of security provided and others.

As an example of a VPN type by topology Site-to-Site VPN, also called Router-to-Router VPN, is commonly used in large companies. Companies or organizations with branch offices in different locations use Site-to-site VPN to connect the network of one office location to the network at another office location.

Basically, Site-to-site VPN creates a virtual bridge between the networks at geographically distant offices and connects them through the Internet and sustains a secure and private communication between the networks. In Site-to-site VPN one router acts as a VPN Client and another router as a VPN concentrator as it is based on Router-to-Router communication. When the authentication is validated between the two routers only then the communication starts.

Types of Virtual Private Network (VPN) by protocol can be divided into Internet Protocol Security, Layer 2 Tunneling Protocol, Point-to-Point Tunneling Protocol, SSL and TLS or OpenVPN.

Internet Protocol Security (IPSec): Internet Protocol Security, known as IPSec, is used to secure Internet communication across an IP network. IPSec secures Internet Protocol communication by verifying the session and encrypts each data packet during the connection. IPSec runs in 2 modes: (i) Transport mode; (ii) Tunneling mode. The work of transport mode is to encrypt the message in the data packet and the tunneling mode encrypts the whole data packet. IPSec can also be used with other security protocols to improve the security system.

Layer 2 Tunneling Protocol (L2TP) is a tunneling protocol that is often combined with another VPN security protocol like IPSec to establish a highly secure VPN connection. L2TP establishes a tunnel between two L2TP connection points and IPSec protocol encrypts the data and maintains secure communication between the tunnel.

Point-to-Point Tunneling Protocol (PPTP) generates a tunnel and confines the data packet to the tunnel. Point-to-Point Protocol (PPP) is used to encrypt the data between the connection. PPTP is one of the most widely used VPN protocols and has been in use since the early release of Windows. PPTP is also used on Mac and Linux apart from Windows.

SSL and TLS: SSL (Secure Sockets Layer) and TLS (Transport Layer Security) generate a VPN connection where the web browser acts as the client and user access is prohibited to specific applications instead of entire network. Online shopping websites commonly use SSL and TLS protocols. It is easy to switch to SSL by web browsers and with almost no action required from the user as web browsers come integrated with SSL and TLS. SSL connections have "https" in the initial of the URL instead of "http".

OpenVPN is an open source VPN that is commonly used for creating Point-to-Point and Site-to-Site connections. It uses a traditional security protocol based on SSL and TLS protocol.

OSI model overview. There are multiple models trying to introduce a classification for the multiple layers and protocols that comprise the computer networks. One of the most established and widely accepted is the Open Systems Interconnection model (OSI model) is a conceptual model that characterizes and standardizes the communication functions of a telecommunication or computing system without regard to its underlying internal structure and technology. Its goal is the interoperability of diverse communication systems with standard communication protocols. The model partitions a communication system into abstraction layers. The original version of the model had seven layers.

A layer serves the layer above it and is served by the layer below it. For example, a layer that provides error-free communications across a network provides the path needed by applications above it, while it calls the next lower layer to send and receive packets that constitute the contents of that path. Two instances at the same layer are visualized as connected by a horizontal connection in that layer.

Layer 4 of the OSI model, the transport layer, is responsible for transferring data across a network and provides error-checking mechanisms and data flow controls. It determines how much data to send, where it gets sent and at what rate. The Transmission Control Protocol is the best known example of the transport layer.

Transmission Control Protocol (TCP) is one of the main protocols of the Internet protocol suite. The protocol provides a communication service at an intermediate level between an application program and the Internet Protocol. It provides host-to-host connectivity at the transport layer of the Internet model. An application does not need to know the particular mechanisms for sending data via a link to another host, such as the required IP fragmentation to accommodate the maximum transmission unit of the transmission medium.

At the transport layer, TCP handles all handshaking and transmission details and presents an abstraction of the network connection to the application typically through a network socket interface.

At the lower levels of the protocol stack, due to network congestion, traffic load balancing, or unpredictable network behaviour, IP packets may be lost, duplicated, or delivered out of order. TCP detects these problems, requests retransmission of lost data, rearranges out-of-order data and even helps minimize network congestion to reduce the occurrence of the other problems. If the data still remains undelivered, the source is notified of this failure. Once the TCP receiver has reassembled the sequence of octets originally transmitted, it passes them to the receiving application. Thus, TCP abstracts the application's communication from the underlying networking details.

TCP flags, options and handshake. TCP packets are very complex and incorporate several mechanisms to ensure connection state, reliability, and flow control of data packets: a) Streams: TCP data is organized as a stream of bytes, much like a file. b) Reliable delivery: Sequence numbers are used to coordinate which data has been transmitted and received. TCP will arrange for retransmission if it determines that data has been lost. c) Network adaptation: TCP will dynamically learn the delay characteristics of a network and adjust its operation to maximize throughput without overloading the network. d) Flow control: TCP manages data buffers and coordinates traffic so its buffers will never overflow. Fast senders will be stopped periodically to keep up with slower receivers. e) Round-trip time estimation: TCP continuously monitors the exchange of data packets, develops an estimate of how long it should take to receive an acknowledgement, and automatically retransmits if this time is exceeded.

Initializing the connection the two endpoints mutually establish multiple operational parameters defining how the participants exchange data, control the state of connection, mitigate quality issues, signal each other when changes in the session management are needed. To achieve this TCP connection utilizes several methods, e.g., TCP flags, or I-bit Boolean fields, in TCP packets' header. Flags are used to indicate a particular state of connection or to provide some additional useful information like troubleshooting purposes or to handle a control of a particular connection. There are several most common flags used for managing the state of a TCP session:

SYN—(Synchronize) Initiates a connection
FIN—(Final) Cleanly terminates a connection
ACK—Acknowledges received data Other flags commonly utilized are: 1) RST (RESET)—is used to terminate the connection if the RST sender feels something is wrong with the TCP connection or that the conversation should not exist. It can get sent from the receiver side when a packet is sent to a particular host that was not expecting it. 2) Push (PSH)—Transport layer by default waits for some time for application layer to send enough data equal to maximum segment size so that the number of packets transmitted on network is minimized which is not desirable by some application that require no latency in data transfer e.g., interactive applications (chatting). Similarly transport layer at receiver end buffers packets and transmits the grouped packets to the application layer if it meets certain criteria, as opposed to immediately when the packets are received. This problem is solved by using PSH. Transport layer sets PSH=1 and immediately sends the segment to network layer as soon as it receives signal from application layer. Receiver transport layer, on seeing PSH=1 immediately forwards the data to the application layer. In general, it tells the receiver to process these packets as they are received instead of buffering them. 3) Urgent (URG)—Data inside a segment with URG=1 flag is forwarded to the application layer immediately even if there is more data to be given to the application layer. It is used to notify the receiver to process the urgent packets before processing all other packets. The receiver will be notified when all known urgent data has been received.

A packet can have multiple flags set. TCP almost always operates in full-duplex mode (two independent byte streams traveling in opposite directions). Only during the start and end of a connection will data be transferred in one direction and not the other.

When the sending TCP host wants to establish connections, it sends a packet with the flag SYN set, to the receiving TCP endpoint. The receiving TCP returns a packet with the flags SYN+ACK set to acknowledge the successful receipt of the segment. The sending TCP sends another ACK segment and then proceeds to send the data. This exchange of control information is referred to as a three-way handshake.

Parameters crucial to effectively communicating between two TCP endpoints are negotiated and established during the 3-way handshake. When the session is well established some of the parameters are dynamically varied to better adapt to ever changing conditions of the live network communication session. The ones most relevant to establishing the context for the functionality enhancement achieved by the invention presented are TCP window size, Round Trip Timeout, as well as Maximum Segment Size which is the most relevant for understanding the way the enhancement works.

Window size. The TCP window size, or as some call it, the TCP receiver window size (RWND), is simply an advertisement of how much data (in bytes) the receiving device is willing to receive at any point in time i.e. how much data the Sender can send without getting an acknowledgement back. The receiving device can use this value to control the flow of data, or as a flow control mechanism. RWND is first communicated during the session initialization and is dynamically updated to adapt to the state of the connection. Both sides of the connection maintain their own RWND.

RTT & RTO. Another relevant factor for determining the quality of the connection and what kind of a throughput the connection has is the delay in communication. In TCP this factor is called RTT, or Round Trip Time. It is essentially the time it takes for the sent packet to be received and acknowledged. During the handshake:

Sender sends a TCP SYN packet to Receiver (this is when the RTT timer begins).

Receiver sends a TCP SYN-ACK packet to Sender (this is where the RTT timer ends).

Sender then sends a TCP ACK packet to Receiver (the TCP connection is now established).

Congestion control mechanisms within TCP stack continuously update RTT throughout the TCP session lifecycle, since RTT is as a major direct factor for the maximum throughput possible during the connection. As an illustration the generic formula to calculate the maximum theoretical throughput (not considering the packet loss) is as follows: maximum bps throughput=Bytes per acknowledgement cycle*8/RTT Where bytes per acknowledgement cycle is the maximum amount of data the sender puts on the wire before getting an acknowledgement from the receiver. The parameter is also known as TCP Window size, discussed above.

It should be taken into account that packet loss probability might change that, but packet loss is a constantly present characteristic of the physical link, so is not depending exclusively on the presence of VPN overhead.

Indirectly RTT also affects the overall throughput due to the retransmission functionality of TCP. During the initial packet sequence of a TCP session, there is a timer called Retransmission Timeout (RTO) that usually has an initial value of one second. After each retransmission of a packet the value of the RTO is doubled, and the computer will retry up to three times. This means that if the sender does not receive the acknowledgement after one second (or RTT>1 seconds), it will resend the packet. At this point the sender will wait for two seconds to get the acknowledgement. If the sender still does not get the acknowledgement, it will retransmit the packet for a third time and wait for 4 seconds, at which point it will give up.

While this is the most well-known fact of RTO, it is not the only benefit of using TCP. The TCP protocol was designed to take in consideration that the connection between two computers is not the same—hence the retransmission logic should be quicker for cases where the two computers are close. This is where RTT starts impacting RTO.

When the TCP connection is established, there is one RTT value, and the RTO will be adjusted based on the Smoothed RTT (SRTT) calculation. The calculation applies a smoothing factor to the RTT which creates a predicted round-trip time that is beneficial to the assurance of packet delivery. If no response packet is received after sending the segment, then the RTO is doubled after each re-transmission and the previous re-transmission is ignored in the RTT calculation. This strategy is known as Karn's Algorithm and is considered to be highly effective, especially in areas with high packet latency.

TCP's performance significantly degrades in multi-hop networks because TCP's retransmission timeouts (RTOs) are frequently triggered regardless of congestion due to sudden delay, e.g., when one of the TCP endpoints is on a wireless network and wireless transmission errors occur. The RTOs caused by wireless errors lead to TCP's undesirable behaviours, such as reducing its sending rate sharply, increasing its back-off value exponentially, even when the network is not congested. Since TCP has no ability to distinguish the cause of an RTO, it is unavoidable for TCP to underutilize available bandwidth by blindly reducing its sending rate due to the false alarms triggering the RTOs.

One could formulate the following to support the significance of RTT:

RTT directly affects the maximum throughput available for the given link.

RTT indirectly affects the efficiency of the link by affecting the RTO and the time it takes to recover from any link failures and malfunctions.

Maximum Segment Size. The Transmission Control Protocol (TCP) has provision for optional header fields identified by an option kind field. Some options may only be sent when SYN is set, others may surface during the established TCP session. Their function is to additionally set optional parameters for the current TCP session, fine tuning the operation of the protocol. MSS is the parameter within the options area that defines how much actual data may be transferred within a TCP segment, apart from the technical headers. This parameter works in concert with the MTU parameter of the underlying IP layer.

To avoid fragmentation, a phenomenon also manifesting at the IP layer, a host must specify the maximum segment size as equal to the largest IP datagram that the host can handle minus the IP and TCP header sizes. Small MSS values will reduce or eliminate IP fragmentation, but will result in packet space underutilized. Each direction of data flow can use a different MSS.

For most computer users, the MSS option is established by the operating system and is 1460 bytes, or the size of standard IP datagram of 1500 bytes minus the minimal IP and TCP headers (20+20 bytes, but TCP has maximum 60 bytes allowed). MSS establishment happens during the initial 3-way handshake and is the result of both TCP endpoints exchanging their desired MSS and both selecting the smaller one. In the case of a VPN connection the layer of encapsulation requires space within the packet, and the bytes needed are also taken away from the payload part. Without encapsulation 1460 bytes are available for the actual data. With encapsulation this is reduced down to 1350-1450 bytes. Wherever the packet is larger in size than this limit—encapsulating it results in a packet that will not fit into a standard IP datagram and such packet will be fragmented.

IP fragmentation is an Internet Protocol (IP) process that breaks packets into smaller pieces (fragments), so that the resulting pieces can pass through a link with a smaller maximum transmission unit (MTU) than the original packet size. The fragments are reassembled by the receiving host.

Fragmentation appears at first to be an elegant solution to the problem, but subtle complications arise in real networks that can result in poor performance or even total communication failure. Fragmentation entails security issues, performance penalties and transmission issues. Fragmentation causes inefficient use of resources—poor choice of fragment sizes can greatly increase the cost of delivering a datagram. Additional bandwidth is used for the additional header information, intermediate gateways must expend computational resources to make additional routing decisions, and the receiving host must reassemble the fragments.

Loss of fragments leads to degraded performance—reassembly of IP fragments is not very robust. Loss of a single fragment requires the higher-level protocol to retransmit all the data in the original datagram, even if most of the fragments were received correctly.

Efficient reassembly is hard—given the likelihood of lost fragments and the information present in the IP header, there are many situations in which the reassembly process, though straightforward, yields lower than desired performance.

Encapsulation. In computer networking, encapsulation is the process of taking data from one protocol and translating it into another protocol, so the data can continue moving across a network. For example, a TCP/IP packet contained within an ATM frame is a form of encapsulation. This process follows the OSI model and occurs on multiple layers, with data flowing two ways in the OSI model, DOWN (data encapsulation) and UP (data decapsulation).

The physical layer is responsible for physical transmission of the data, link encapsulation allows local area networking, Internet Protocol (IP) provides global addressing of individual computers, and Transmission Control Protocol (TCP) selects the process or application, i.e. the port which specifies the service such as a Web or TFTP server.

During encapsulation, each layer builds a protocol data unit (PDU) by adding a header (and sometimes trailer) containing control information to the Service Data Unit (SDU) from the layer above. For example, in the Internet protocol suite, the contents of a web page are encapsulated with an HTTP header, then by a TCP header, an IP header, and, finally, by a frame header and trailer. The frame is forwarded to the destination node as a stream of bits, where it is decapsulated (or de-encapsulated) into the respective PDUs and interpreted at each layer by the receiving node.

The result of encapsulation is that each lower layer provides a service to the layer or layers above it, while at the same time each layer communicates with its corresponding layer on the receiving node. These are known as adjacent-layer interaction and same-layer interaction, respectively.

However, in the context of a VPN service encapsulation acquires additional significance due to the notion of tunneling.

Most VPNs rely on tunneling to create a private network that reaches across the internet. Tunneling is the process of placing a payload packet having desired data to be communicated, within an outer packet, and transporting the payload packet within the outer packet, over the internet. The outer packet protects the contents from public view, and in this manner, the payload packet moves within a virtual tunnel.

Computers or other network devices at both ends of the tunnel, called tunnel interfaces, can encapsulate outgoing packets and decapsulate incoming packets. Users (at one end of the tunnel) and IT personnel (at one or both ends of the tunnel) configure the tunnel interfaces to use a tunneling protocol. Also called an encapsulation protocol, a tunneling protocol is a standardized way to encapsulate packets. The important fact though is that as a standard encapsulation process tunneling requires an additional overhead of wrapping the packets in more technical headers and sometimes tailing data, which leaves less space for the actual payload.

TCP session over VPN tunnel. VPN customers generally use TCP for connection to resources on the Internet while connected to the VPN service provider. As a standard during the connection, a single end-to-end TCP link is established over the VPN tunnel from the VPN customer to the target resource on the Internet. The endpoints of this TCP connection negotiate, or inform each other of, the set of network capability thresholds available to them, through the use of optional parameters defined within the packets. When communicated during the established connection, these parameters will drive the functionality of the protocol, helping effectively manage the bandwidth available, and mitigate any negative factors interfering with the flow of data e.g., latency, congestion and packet loss. The parameters established during the initial phases of the connection, among others, are: randomly generated Sequence number, Retransmission Time Out (derived from RTT), mutually negotiated Maximum Segment Size (further MSS), Window scaling and the support for Selective ACK.

The end-to-end nature of the standard TCP connection, occurring between the VPN customer and the target server on the Internet, results in that the protocol parameters may be negotiated between endpoints placed in networks of disparately varying capabilities. The whole connection will be controlled according to the parameters that must conform to the capabilities of all participants of the connection, even when it means they are not the optimal ones.

In case of a TCP session traversing a VPN tunnel the parameters of the TCP connection adapt to the restrictions imposed by the VPN encapsulation. Namely the TCP packets passing through a VPN tunnel undergo the process of encapsulation, their resulting actual payload is reduced due to the fact that the technical headers take more space within the strictly controlled packet structure. Depending on the settings of the underlying VPN tunnel the actual space dedicated to useful data can be reduced down to 1350-1450 bytes.

The end-to-end nature of the standard TCP connection from a VPN client to any target on the Internet means this ineffective setting will be enabled throughout the whole connection, even for the part of the connection between the VPN concentrator and the target server, where the tunnel is no longer present and encapsulation is no longer in place.

The end-to-end nature of the connection in question also results in the RTT being measured end-to-end, meaning that all functionality dependent on RTT suffers some detrimental effect.

SUMMARY

To improve the quality of the VPN service, a solution is proposed to terminate an attempted end-to-end TCP connection 103 between the VPN user 100 and the Target server 104, at the VPN concentrator 102 that the TCP connection goes through, converting the end-to-end TCP connection 103 into a two-leg TCP connection, where the two legs of the TCP connection are processed and united by a packet processing software 116 executed within the VPN concentrator 102. In one aspect, the present embodiment provides a solution to mitigate the effect VPN tunnel encapsulation makes to the characteristics of the TCP session passing said VPN tunnel, such as decreasing the Maximum Segment Size, reducing the effectiveness of the link.

Moreover, the overall Round Trip Time between the VPN user 100 and the Target server 104 is also split in two parts and is now measured separately for two independent segments—VPN user 100 to VPN concentrator 102, and the VPN concentrator 102 to the Target server 104. As a result, the throughput for each segment is increased, link malfunction processing and restoring the optimal TCP session parameters take shorter time, the connection between the VPN concentrator 102 and the Target server 104 enjoy the full plethora of optimized parameters available to datacenter-grade network infrastructure.

In an embodiment a VPN user 100 establishes a VPN connection to a VPN concentrator 102 and then initiates a Second TCP connection to a Target server 104 through the VPN connection. To ensure that transferred packets are not lost and that they are transferred more speedily the Second TCP connection 108 is terminated at the VPN concentrator 102. The termination is performed by a packet processing software 114 installed and executed within the VPN concentrator 102. The original Second connection 108 from the VPN user 100 and the VPN concentrator 102 is preserved e.g., sequence numbering is kept intact. A new TCP connection 110 is initiated between the VPN concentrator 102 and the Target server 104. Separated connections can occur over links of different characteristics. For example, VPN user 100 can use high-loss low-speed wired or wireless connections (such as mobile LTE or public Wi-Fi), whereas a connection between the VPN concentrator 102 and the Target server 104 can be a high-speed wired connection (e.g., Gbit Ethernet). As a consequence, each connection in the two-leg connection will establish its own set of TCP session parameters optimized for the type of connection.

Second TCP connection 108, established between the VPN user 100 and the VPN concentrator 102, has First MSS 122 defined, by the packet processing software 116, for both participants of the connection during the TCP handshake process. Both VPN user 100 and VPN concentrator 102 use the First MSS 122 size respective to have the packets they send to each other fit into a standard transfer unit (IP datagram) of 1500 bytes in order to avoid fragmentation.

While establishing a TCP session, both participating end-points inform their counterpart of the desired MSS parameter value. However, it is assumed that in case of a private customer connectivity the biggest share of the traffic is downstream, hence the download speed holds bigger priority. Therefore, optimizing the download MSS parameter is the primary purpose in the context of the current embodiments. In the case of OpenVPN protocol, a well-established VPN product and protocol: 20 to 60-byte IPv4 header or 40 byte IPv6 header; 8 Byte L4 (UDP) Header or 20 to 60-byte IPv4 header; 1 to 4 Byte OVPN Protocol header (1 Byte Type+3 Byte Peer ID). To avoid fragmentation, the payload of the IP datagram—the actual TCP packet, must be reduced by 32 bytes in case of IPv4 datagram or 52 bytes in case of IPv6. In case of Wireguard protocol, a part of another VPN product: 20-byte IPv4 header or 40 byte IPv6 header; 8-byte UDP header; 4-byte type; 4-byte key index; 8-byte nonce; 16-byte authentication tag.

To avoid fragmentation of the wrapping IP datagram, the TCP packet inside it in some cases may have to be reduced by at least 40 bytes in case of IPv4 datagram or 60 bytes in case of IPv6. The overhead may be even bigger in case of TCP-based variants of the VPN protocol.

Reiterating, it should be noted that explicitly reducing MSS for TCP packets wrapped for traversing the VPN tunnel is the actual step that allows the IP datagrams that contain said TCP packets to fit into 1500 bytes limit of the standard Internet network transport unit, hence avoiding fragmentation.

The packet processing software 116 executed within the VPN concentrator 102 further initiates TCP connection 110 between the VPN concentrator and the Target server 104. Since this connection incurs no additional VPN-related encapsulation the TCP packets are formed with the payload given the maximum possible share of the space within the packet.

As an example, the technical overhead for the structure of a TCP packet within said session may look as follows: 20-byte IPv4 header or 40 byte IPv6 header. No additional MSS-reducing measures are needed to avoid fragmentation.

Yet in another embodiment, the termination of a TCP session is used for long distance connections or for sending big packets of data. For example, when a user 100 is based in the Netherlands, the VPN concentrator 102 is based in the US and the Target server 104 is in Finland a long distance occurs between all actors.

The RTT for distant connections can be noticeably improved by initiating a new TCP session between the VPN concentrator 102 and the Target 104. Same analogy applies when big data packets are transferred between the mentioned actors.

In another embodiment, a termination of a TCP connection by a VPN concentrator 102 is used in TCP-based VPN tunneling. The termination is also used for targeting different information, such as web page content, downloading video or audio files, video streaming or similar.

An embodiment of the disclosed implementations is a method that includes establishing an encrypted tunnel between a virtual private network (VPN) server and a VPN user device; receiving via the encrypted tunnel a request from the VPN user device to establish a connection with a target device, where the request uses initial connection parameters; and converting the connection into a first connection between the VPN user device and the VPN server and a second connection between the VPN server and the target device, where communication over the first connection between the VPN user device and the VPN server is carried out via the encrypted tunnel, the first connection uses first connection parameters and the second connection uses second connection parameters, and at least one parameter of the first connection parameters or of the second connection parameters is different from a corresponding parameter of the initial connection parameters. The method also includes converting first network packets received from the VPN user device according to the first connection parameters into second network packets according to the second connection parameters; and transmitting the second network packets to the target device.

An embodiment of the disclosed implementations is a virtual private network (VPN) server that includes a processor that configured to execute instructions to establish an encrypted tunnel between the VPN server and a VPN user device; receive a request from the VPN user device to establish a connection with a target device, where the request uses initial connection parameters; and convert the connection into a first connection between the VPN user device and the VPN server and a second connection between the VPN server and the target device, where communication over the first connection between the VPN user device and the VPN server is carried out via the encrypted tunnel, the first connection uses first connection parameters and the second connection uses second connection parameters, and at least one parameter of the first connection parameters or of the second connection parameters is different from a corresponding parameter of the initial connection parameters. The processor is further configured to convert first network protocol data units received from the VPN user device according to the first connection parameters into second network protocol data units according to the second connection parameters; and transmit the second network protocol data units to the target device.

An embodiment of the disclosed implementations is a non-transitory computer readable medium that stores instructions operable to cause one or more processors to perform operations that include establishing an encrypted tunnel between a virtual private network (VPN) server and a VPN user device; receiving via the encrypted tunnel a request from the VPN user device to establish a connection with a target device, where the request uses initial connection parameters; and converting the connection into a first connection between the VPN user device and the VPN server and a second connection between the VPN server and the target device, where communication over the first connection between the VPN user device and the VPN server is carried out via the encrypted tunnel, the first connection uses first connection parameters and the second connection uses second connection parameters, and at least one parameter of the first connection parameters or of the second connection parameters is different from a corresponding parameter of the initial connection parameters. The operations also include converting first network packets received from the VPN user device according to the first connection parameters into second network packets according to the second connection parameters; and transmitting the second network packets to the target device.

BRIEF DESCRIPTION OF DRAWINGS

FIG. 1B demonstrates the general layout of a TCP connection across a VPN tunnel with a TCP split.

FIG. 2A demonstrates a standard encapsulation overhead incurred by passing a VPN tunnel. It should be noted that this generic diagram does not include the overhead incurred by a particular VPN protocol. As an example—out of every IP datagram of 1500 bytes, the following space is taken away from the payload due to VPN-related encapsulation overhead. UDP-based variants of the VPN protocols are taken into consideration.

DETAILED DESCRIPTION

Figure 1A:
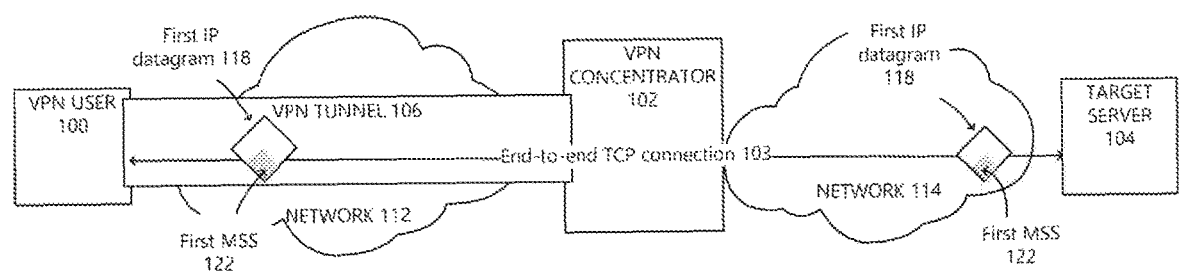
FIG. 1A is a depiction of TCP traffic from a VPN user 100 through a VPN concentrator 102 to a Target server 104 on the Network, that might be the Internet, with TCP session being end-to-end. It demonstrates the general layout of TCP connection across a VPN tunnel without a TCP split.

Some general terminology descriptions may be helpful and are included herein for convenience and are intended to be interpreted in the broadest possible interpretation. Elements that are not imperatively defined in the description should have the meaning as would be understood by the person skilled in the art.

VPN user 100—a person or a business entity that is using VPN services. As a standard placed within a customer-grade network, working over such transport links as Wi-Fi, mobile data networks, residential networks. VPN user initiates and establishes the encrypted VPN connection to a VPN concentrator.

VPN concentrator 102—a computing device attached to a computer network that accepts VPN users' requests for establishing encrypted connection, or tunnel, and is the endpoint of such encrypted connections from multiple VPN users. As a standard with VPN tunneling protocol endpoints, on establishing a VPN connection, or tunnel, with a VPN user VPN concentrator becomes the default gateway for the VPN user.

Packet processing software 116 is a program executed within VPN concentrator that performs the initial end-to-end TCP session termination, splitting it into two separate TCP connections and managing the packets between said connections, e.g., buffering, disassembling and reassembling of data packets traversing the multi-part TCP connection over the VPN tunnel.

Data packet—unit of data made into a single package that travels along a given network path. Data packets are used in Internet Protocol (IP) transmissions for data that navigates the Web, and in other kinds of networks. IP packet includes: 1) an overhead (such as the source IP address, which is the IP address of the machine sending the data; the destination IP address, which is the machine or device to which the data is sent; the sequence number of the packets, a number that puts the packets in order such that they are reassembled in a way to get the original data back exactly as it was prior to transmission; the type of service; flags; some other technical data) and 2) a payload (represents the bulk of the packet and is actually the data being carried).

Target or Target server 104—a server serving any kind of content accessible over multiple protocols over the Internet. Most often a device placed within a datacenter network of high reliability and capability.

Network 112; 114—a digital telecommunications network that allows nodes to share resources. Examples of a network: local-area networks (LANs), wide-area networks (WANs), campus-area networks (CANs), metropolitan-area networks (MANs), home-area networks (HANs), Intranet, Extranet, Internetwork, Internet.

UDP or User Datagram Protocol—a connection-less protocol whereby one device sends loads of data to another device and ends the relationship. All packets are independent of each other and the application layer has to reorganize them at the receiving end. UDP tunnel is used by DNS (Domain Name System), DHCP (Dynamic Host Configuration Protocol), SNMP (Simple Network Management Protocol) and VOiP (Voice Over Internet Protocol).

Tunneling or Tunnel 106—a protocol that allows for the secure movement of data from one network to another. Tunneling involves allowing private network communications to be sent across a public network, such as the Internet, through a process called encapsulation. The encapsulation process allows for data packets to appear as though they are of a public nature to a public network when they are actually private data packets, allowing them to pass through unnoticed. Encapsulation allows the packets to arrive at their proper destination. At the final destination, decapsulation and decryption occur.

Downstream—refers to the direction of network communication and designates the packets that travel back to the customer from the Internet in general or from the provider server. It is loosely associated with downloading data, as opposed to upstream direction, which is associated with uploading data.

The present embodiments now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1A depicts that the VPN user 100 connects to the VPN concentrator 102 over the Network 112, that can be the Internet, and establishes secure VPN connection 106 with said VPN concentrator 102. As a standard and an established practice, the secure VPN connection 106 becomes the default pathway for the VPN user trying to reach any targets on the Internet or any other network, with VPN concentrator 102 becomes the default gateway for the VPN user 100.

While establishing the connection, multiple parameters are also established that comprise the operational context for both VPN tunnel endpoints, e.g., encryption settings and transport layer settings. Depending on the VPN and tunneling product used the parameters may be protocol, port, network adapter mode, cryptographic algorithms used for data encryption and meta channels e.g., key exchange, compression, certificates, keys and others.

On secure VPN tunnel 106 establishment VPN user 100 further initiates a Second TCP connection 108 to a Target Server 104 on the Network 114, which may be the Internet. Since VPN concentrator 102 becomes the default gateway to any targets the VPN user 100 tries to reach on the Internet or any other network, the TCP connection occurs over the encrypted tunnel 106, established previously.

Figure 2A:
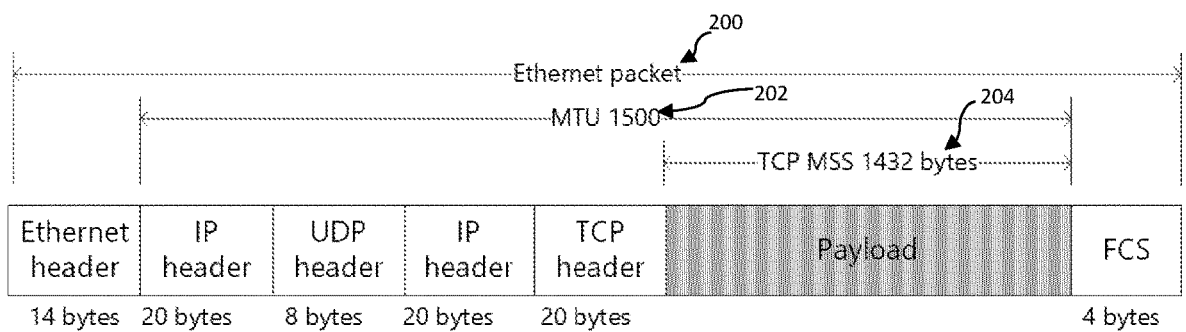
FIG. 2A is a depiction of a generic Ethernet packet 200 with the encapsulation overhead incurred by VPN. It demonstrates a standard packet with no encapsulation.

As demonstrated by FIG. 2A a portion of each of the packets transferred within the VPN tunnel 106 is used up by the encapsulation overhead that is a part of VPN tunnel 106 functionality requirement. Due to the underlying Layer 2 protocols sizing the packets according to the standards of the physical network additional IP and UDP headers, induced by encapsulation, enlarge the packet, competing with the actual payload for the space within the packet. That leaves less space for the payload, resulting in more packets with less payload within them. To prevent that, a smaller MSS value is established in order to account for the said additional encapsulation headers.

While establishing a TCP session, both participating end-points inform their counterpart of the desired MSS parameter value. However, it is assumed that in case of a private customer connectivity the biggest share of the traffic is downstream, hence the download speed holds bigger priority. Therefore, optimizing the download MSS parameter is the primary purpose in the context of the current embodiments.

Figure 1B:
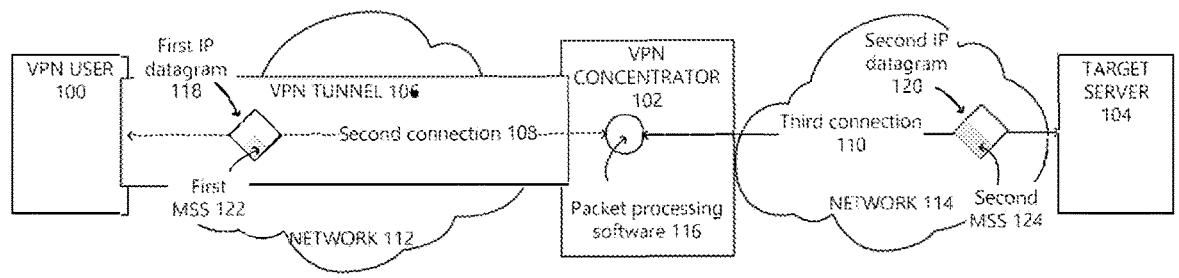
FIG. 1B is a depiction of TCP traffic from a VPN user 100 through a VPN concentrator 102 to a Target server 104 on the Internet with TCP session split.

FIG. 1B further describes how within the context of the current embodiment the packet processing software 116 executed within the VPN concentrator 102, terminates the Second TCP connection 108 and admits the configuration context and control of the connection, operating the Second TCP connection 108 between the VPN user 100 and the Target server 104, amending it with Third connection 110. During the establishment of Second connection 108 both VPN user 100 and VPN concentrator 102 inform each other of the desired MSS, however the packet switching software 116 at the VPN concentrator 102 intercepts the MSS declarations from both endpoints, and changes the MSS options within them to First MSS 122 as a parameter of the TCP session underlying Second connection 108. The only exception to this rule is the case when the MSS declared by an end-point is already smaller than the First MSS value. First MSS affects the formation of packets sent between VPN concentrator 102 and VPN user 100 both ways.

When the packet processing software 116, executed within the VPN concentrator 102, creates Third connection 110 to the target 104 on the Internet, VPN concentrator 102, as an end-point of the connection, sets a Second MSS 124 as desired MSS parameter of the TCP session underlying Third connection 110. Second MSS 124 affects the formation of packets sent from the Target server 104 to VPN concentrator 102. As demonstrated by FIG. 2B the packets travelling throughout the Third connection 110 are not affected by the VPN Tunneling overhead and do not contain additional headers dedicated to the wrapping protocol information, therefore dedicating all the available space to the payload.

Figure 3A:
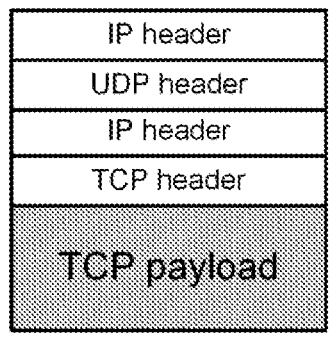
FIG. 3A is a depiction of IP datagram structure with VPN-related encapsulation.
Figure 3B:
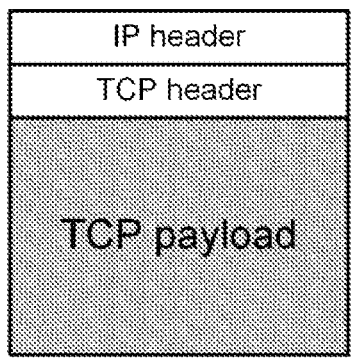
FIG. 3B is a depiction of IP datagram structure without VPN-related encapsulation.

FIG. 3A demonstrates the structure of an IP datagram 118 containing a UDP-wrapped IP datagram inside, which in turn contains a TCP packet. This is compared to a regular IP datagram 120, without encapsulation, containing a TCP packet, as depicted in FIG. 3B.

The packet processing software controls and operates both Second 108 and Third 110 connections simultaneously, transmitting data back and forth between both connections and corresponding network endpoints.

As will be described in further detail below, the VPN concentrator 102 with the packet processing software 116 onboard maintains operation of end-to-end connection combined of Second connection 108 and Third connection 110. It does so by keeping the initial packet sequencing of First connection 108 between the VPN user 100 and the VPN concentrator 102, maintaining packet sequencing for Third connection 110 and forwarding the packets between the two connections, converting the packet to align to the parameters of the connection e.g., modifying the size of the packet according to the values of MSS option declared by the counterpart end-point, or substituting the destination IP address and port with the correct attributes of the destination end-point.

Since the VPN concentrator 102 hereby acts as the destination and source, respectively, to the source and destination endpoint of the TCP connections, the VPN concentrator 102 includes all the functionality of a regular TCP endpoint, such as connection management, packet sequencing, congestion control, flow control, acknowledgement transmissions, acknowledgement receipt processing, loss detection, and loss recovery.

In another embodiment, the traffic coming from the VPN client 100 may be selectively subjected to the termination and splitting depending on the protocol, and correspondingly, the type of data the customer requests. The session is either passed on in an end-to-end fashion, or is instead split into multi-part, e.g., two-leg connection. As an example, the VPN concentrator 102 may be instructed to terminate the Second connection 108 when the destination TCP port is port 80, or HTTP. Correspondingly, the VPN concentrator 102 may be instructed to leave requests to destination port 22, or SSH, without TCP session termination.

In yet another embodiment, the traffic coming from the VPN client may be selectively subjected to the termination and splitting depending on the distance between the connection endpoints—VPN client 100, VPN concentrator 102 and the Target server 104. Since the multi-part connection does best with the connections prone to latency or of widely different technical capabilities, the longer distance there is between the participants the higher the chance that the two-leg connection brings more benefit. Therefore, the VPN concentrator 102 may be instructed to subject incoming TCP connection requests, originating at VPN users 100, to a determination of geographical location of both VPN user 100 and the Target server 104. Correspondingly VPN concentrator 102 may be configured to only direct the incoming TCP session request to packet processing software 116 for TCP session termination and splitting in case the distance between the end-points is above a pre-configured threshold e.g., the combined connection between the VPN user, VPN concentrator and the Target server connection has cross-continent segments in it.

FIG. 1A depicts an end-to-end TCP connection 103 through VPN concentrator 102 from a VPN user 100 to a Target server 104 on the Internet, with the TCP session being end-to-end. It demonstrates the general layout of TCP connection across a VPN tunnel without a TCP split. In FIG. 1A, VPN user 100 connects to the VPN concentrator 102 initiating a VPN encrypted tunnel connection 106. Once the VPN tunnel 106 is established, the VPN user 100 connects to the Target server 104 through the VPN tunnel 106 and sends First IP datagram 118 through to Network 112. The First IP datagram 118 contains First MSS 122, which is the maximum segment size value the VPN user 100 is willing to accept on the network layer. Once the data packet is sent from the VPN user 100 to the Target server 104, the same data packet travels all the way from the one Network 112 to the other Network 114. No changes in the data packet are made by the VPN concentrator 102, that is, the VPN concentrator 102 does not interrupt the connection established by the VPN user 100 and the Target server 104.

FIG. 1B is a depiction of TCP traffic from a VPN user 100 through a VPN concentrator 102 to a Target server 104 on the Internet with TCP session split. FIG. 1B demonstrates the general layout of a TCP connection across a VPN tunnel with a TCP split. VPN user 100 connects to the VPN concentrator 102 and establishes a VPN tunnel 106. Then VPN user 100 sends First IP datagram 118 with the First MSS 122 through the Second connection 108. As described above this value is set by the Packet processing software 116 within VPN concentrator 102 during the initial handshake of the TCP session end-point, for packets travelling in both directions, substituting the MSS value initially requested by the end-points with a value of its own. A Network 112 is used to transfer First IP datagram 118. Once the First IP datagram 118 is received at VPN concentrator 102, the Packet processing software 116, that is running in the VPN concentrator 102, establishes a new Third connection 110 to continue transferring the VPN user's 100 request to the Target server 104. At VPN concentrator's 102 side, the IP datagrams coming from the Second connection are converted into the IP datagrams for the Third connection, having higher MSS size since there is not VPN tunnel overhead. The Second datagram 120 returning from the Target server 104 to the VPN concentrator 102 will have the MSS established according to the value of Second MSS 124 set by the Packet processing software 116 as the MSS desired by the VPN concentrator within the context of the Third connection. The Second IP datagram travels from the Target server 104 to the VPN concentrator 102, whereas the First IP datagram 118 travels from the VPN user 100 to the VPN concentrator 102.

FIG. 2A is a depiction of a generic Ethernet packet 200 with the encapsulation overhead incurred by VPN. It demonstrates an example of the structure of First IP datagram 118, when data packet is transferred using a VPN connection. FIG. 2A demonstrates a standard encapsulation overhead incurred by passing a VPN tunnel. It should be noted that this generic diagram does not reflect the exact overhead incurred by a particular VPN protocol. As a more exact example—in UDP-based VPN protocols out of every IP datagram of MTU 1500 bytes 202, the combined space of at least 28 bytes (IP header and UDP header) is taken away from the payload due to VPN-related encapsulation overhead. Because of the VPN-related encapsulation headers, the Payload is reduced to TCP MSS 1432 bytes 204.

Figure 2B:
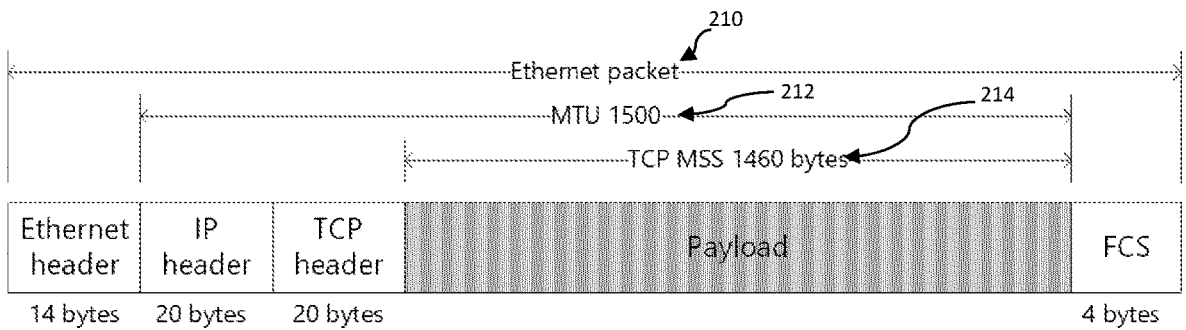
FIG. 2B is a depiction of a generic Ethernet packet without the encapsulation overhead incurred by VPN.

FIG. 2B is a depiction of a generic Ethernet packet 210 without the encapsulation overhead incurred by VPN. This figure is an example of Second IP datagram 120. In this figure the headers, that are used by VPN connection, are exempted. This exemption allows increase in the Payload size to TCP MSS 1460 bytes 214. The size of MTU 1500 (212) in the present example is the same as presented in FIG. 2A.

FIG. 3A is a depiction of IP datagram 118 structure with VPN-related encapsulation. The present example shows that IP datagram 118 has at least VPN IP header, UDP header of the encapsulating packet, and IP header and TCP header of the encapsulated packet. The TCP payload is reduced due to UDP header and related IP header.

FIG. 3B is a depiction of IP datagram 120 structure without VPN-related encapsulation. The present example shows the increase of TCP payload size, because in the absence of VPN tunnel, the UDP header and IP header are not needed.

Figure 4:
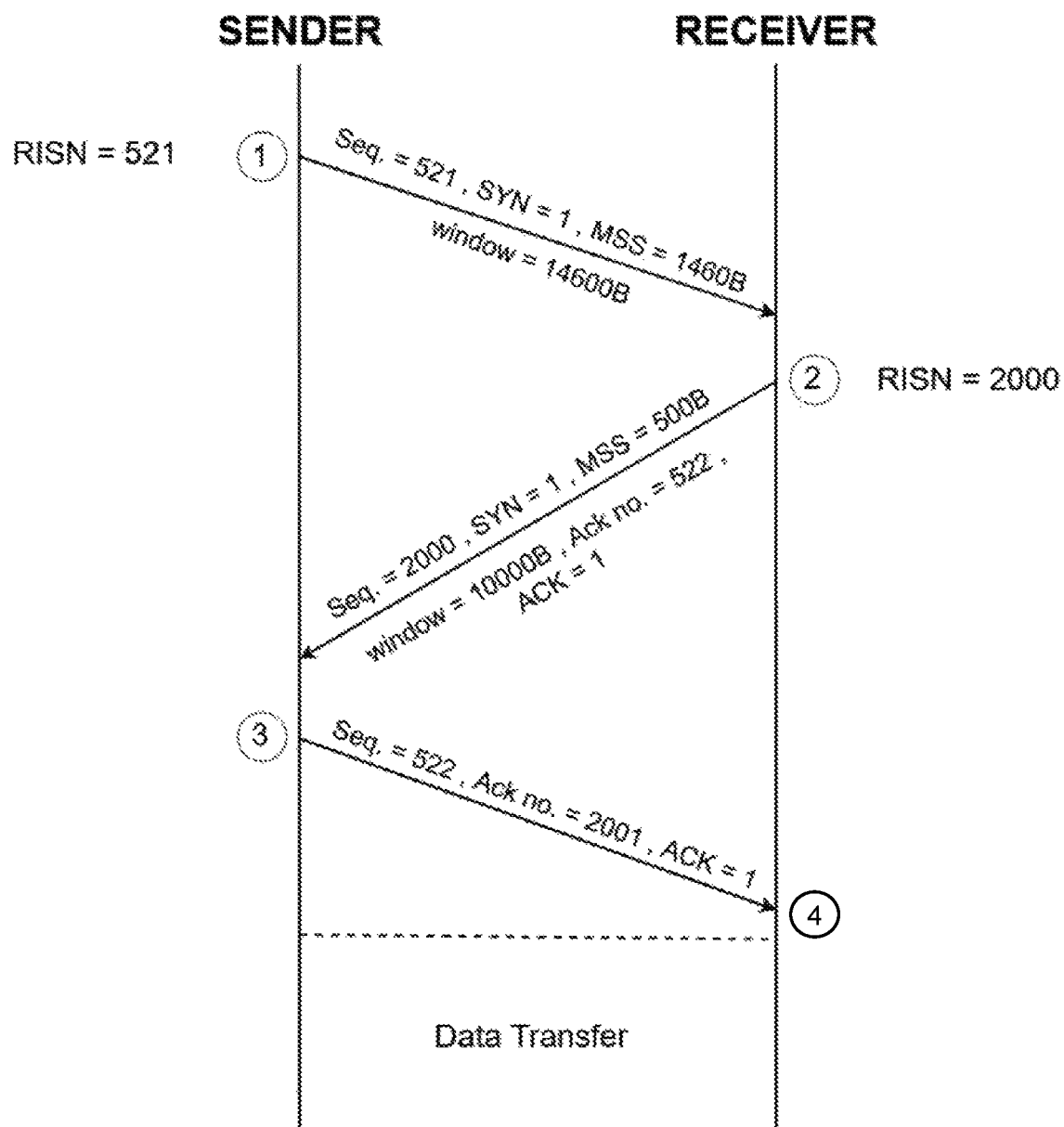
FIG. 4 is a depiction of a TCP session initiation sequence.

FIG. 4 is a depiction of a TCP session initiation sequence, or 3-way handshake between the sender and receiver, and data transfer herein. By the first step, in the present example, sender sends information in a data packet: random initial sequence number (RISN) 521, SYN 1 (meaning that SYN flag is set), MSS 1460 bytes, windows size 14600 bytes. By the second step, receiver send to the sender a response that, in the present example, has sequence number 2000, SYN 1 (meaning that SYN flag is set), MSS 500 bytes, windows size 10 000 bytes, acknowledgement sequence number 522, ACK=1 (meaning acknowledgement flag is set). By the third step, in the present example, the sender sends a request with the sequence number 522, acknowledgement number 2001, ACK=1 (meaning acknowledgement flag is set). Since a TCP connection is a method of transmitting two byte streams, one stream in each direction, there is a need to map the unordered, unreliable bytes in IP packets to the ordered bytes in this stream. Therefore, each byte in each stream is identified by a sequence number. The sequence number is the byte number of the first byte of data in the TCP packet sent (also called a TCP segment). The acknowledgement number is the sequence number of the next byte the receiver expects to receive.

Figure 5:
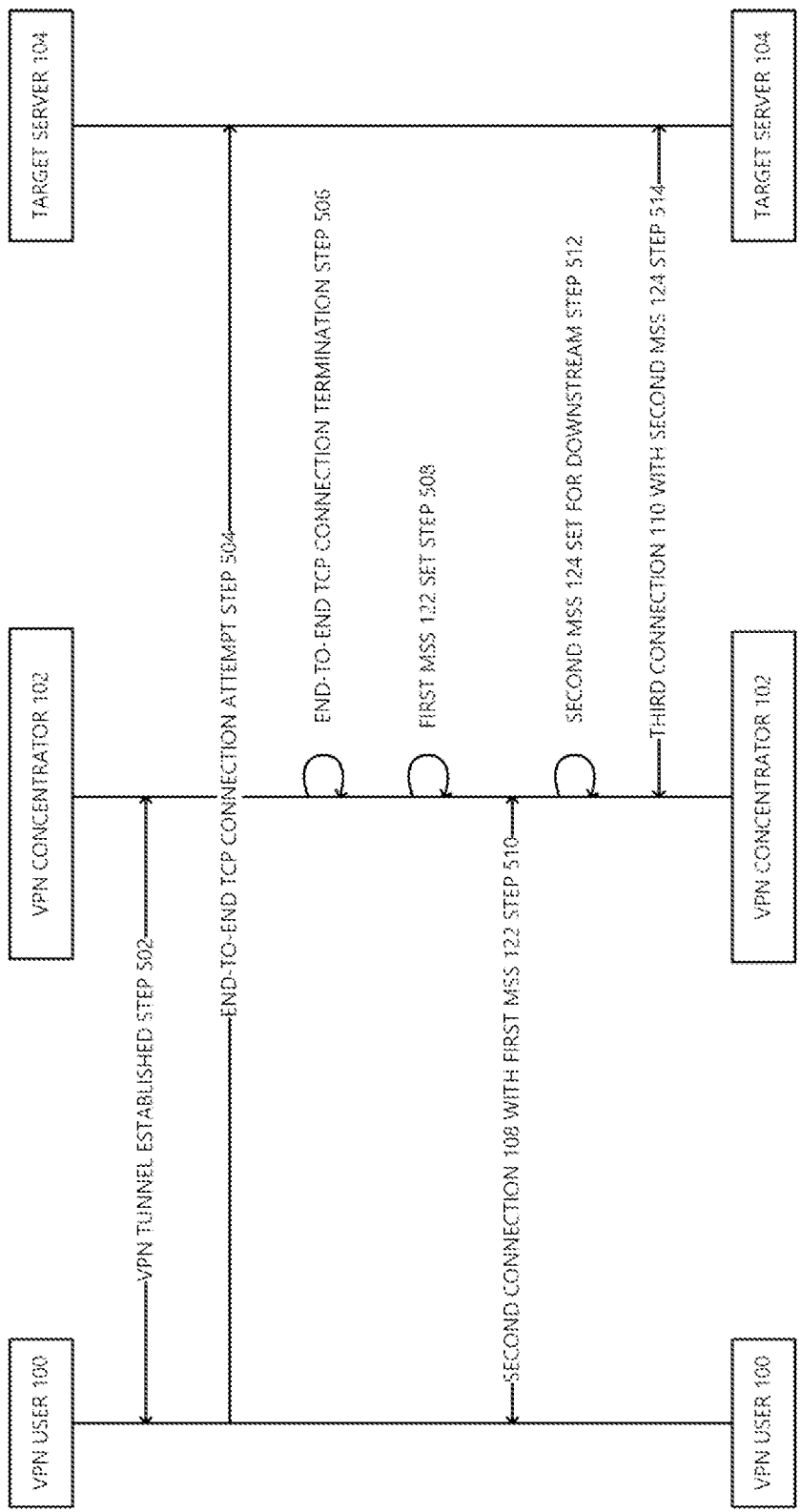
FIG. 5 is a depiction of the TCP session flow for a VPN customer connecting to a Target server on the Internet through a VPN service.

FIG. 5 is a depiction of the TCP session flow for a VPN customer 100 connecting to a Target server 104 on the Internet through a VPN concentrator 102. VPN user 100 established (step 502) a VPN tunnel 106 with VPN concentrator 102. Then, VPN user 100 attempts to establish (step 504) a Second connection 108 with the Target server 104. Packet processing software 116 terminates (step 506) the Second connection 108 and sets (step 508) the limits of the first MSS 122. The Second connection 108 with the First MSS 122 is established during step 510. Packet processing software 116 then sets the value of Second MSS 124 (step 512). Third connection 110 is then established (step 514) with the second MSS 124 set for the packets traversing the Third connection from the Target server 104 to the VPN concentrator 102.

Figure 6:
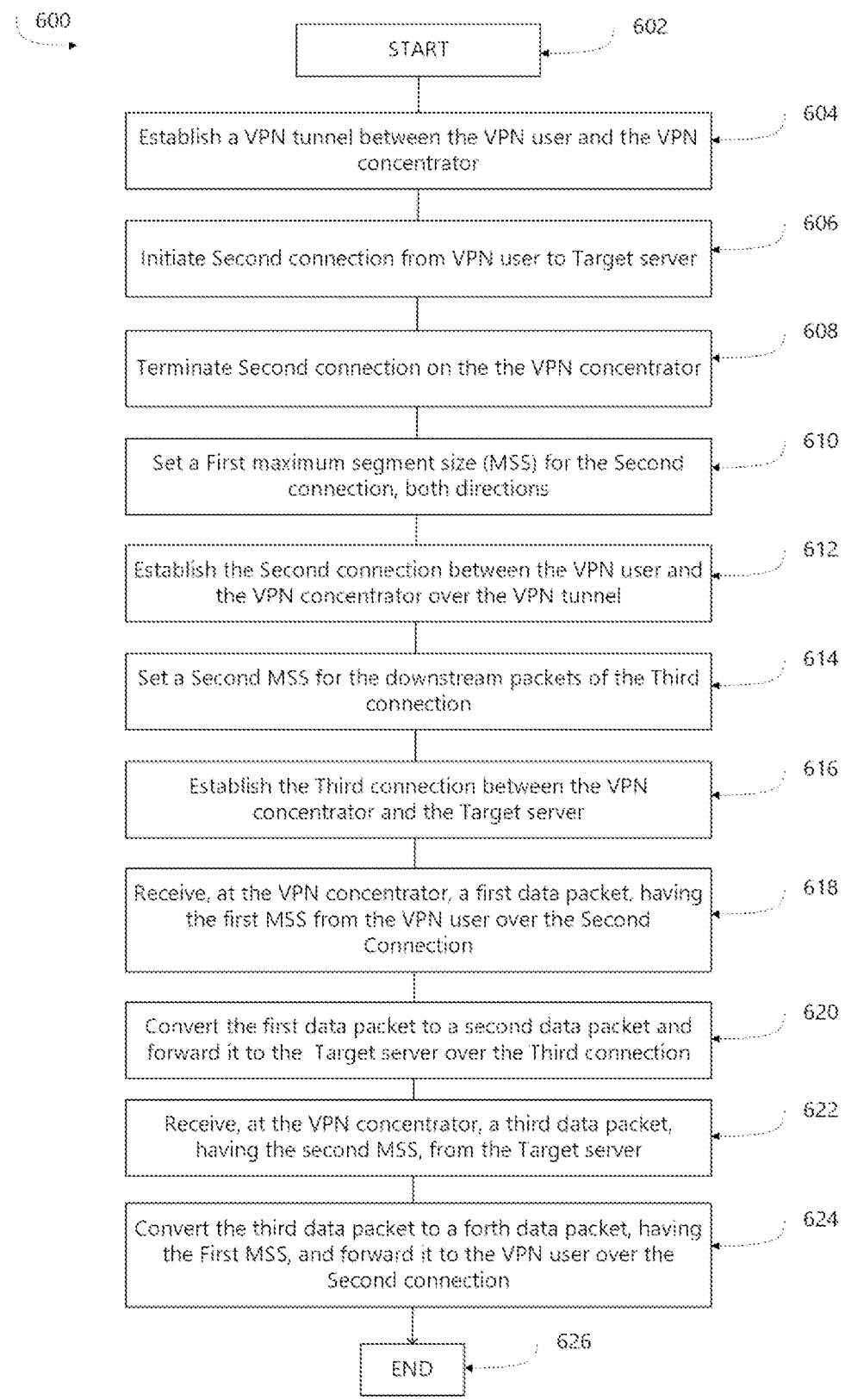
FIG. 6 is a flow diagram of a method for data transmission over a VPN.

FIG. 6 depicts another embodiment of a method for data transmission over a VPN 600, as performed by the packet processing software 116 of the VPN concentrator 102. The method 600 starts at step 602, and proceeds to step 604, at which a VPN tunnel 106 is established between a VPN user (e.g., the VPN user 100 of FIG. 1B) and the VPN concentrator. The method 600 proceeds to step 606, where the VPN user initiates a Second connection 108 with the VPN concentrator 102 over the VPN tunnel 106. At step 608, packet processing software 116 terminates the Second connection 108 at the VPN concentrator 102. At step 610 of the method 600 a First MSS 122 is set for both end-points of the Second connection 108 i.e. the First MSS 122 is set for both directions of the Second connection 108. As an alternative the First MSS 122 may be enforced by the packet processing software 116 within the VPN concentrator 102. The method 600 proceeds to step 612, where the Second connection 108 is established between the VPN User 100 and the VPN concentrator 102. At step 614 the Second MSS is set for the downstream data packets traversing the Third connection 110. As an alternative the Second MSS 124 may be enforced by the packet processing software 116 within the VPN concentrator 102. At step 616 the Third connection 110 is established between the VPN concentrator 102 and a Target server 104. According to some embodiments, the Third connection 110 is a TCP connection.

At step 618, the method 600 receives a first data packet having the first MSS 122 from the VPN user 100 over the Second connection 108. At step 620, the method 600 converts the First data packet having the first MSS 122 to a Second data packet having the MSS independently set by the Target server 104. Within the same step 620, the method 600 sends the Second data packet having the independent MSS to the Target server 104 over the Third connection 110. The method 600 further additionally transfers data from the Target server to the VPN user in a similar manner. For example, at step 622 VPN concentrator 102 receives a third data packet having the second MSS 124 over the third connection 110, converts the third data packet having the second MSS 124 to a fourth data packet having the first MSS 122. At step 624 VPN concentrator 102 sends the fourth data packet to the VPN user 100 over the second connection 108.

While the drawings illustrate embodiments in which a TCP connection is split into two parts, the techniques described herein can be extended to split the TCP connection into three or more parts. For example, instead of one VPN Concentrator, multiple VPN Concentrators may be used between the VPN user and the target server.

In this manner, the packet processing software 116 effectively splits an end-to-end connection between the VPN user and the target server, at the VPN concentrator 102, into the second and third connections, where the second connection is over the VPN tunnel 106. Each of the second and the third connections are optimized according to their respective endpoints, that is the VPN user 100 and the VPN concentrator 102 for the second connection 108, and the VPN concentrator 102 and the target server 104 for the third connection 110.

The disclosure describes a method for improving VPN service transmission quality comprising steps: establishing, by the VPN User, VPN Tunnel to VPN concentrator; initiating, by the VPN User, Second TCP connection to a Target on a network via the VPN concentrator; terminating, at the VPN concentrator, the end-to-end TCP connection locally, and establishing the Second connection between VPN user and VPN concentrator; determining, at the VPN concentrator, the First maximum segment size (MSS); initiating, by the VPN concentrator, Third connection to the Target server, determining a Second MSS; transparently passing traffic, by the VPN concentrator, to the VPN User from the Target through the Third connection and the Second connection; and at the VPN user and at the VPN concentrator, closing the Second connection and the Third connection, at the end of VPN User and Target conversation.

The Packet processing software is running in the VPN concentrator and is performing at least the following actions: establishing, maintaining and closing the Second and Third connections; and establishing the TCP session parameters for the Second and Third connections: MSS, Window size and window scale, the ability to use Selective ACK, Sequence number, or Retransmission Time Out (RTO), and buffering, disassembling and reassembling of data packets traversing the multi-part TCP connection over the VPN tunnel.

In the current method the Target server may be a destination on the Internet. The VPN Tunnel connection being a network layer (Layer 3 of OSI model) connectivity instance. The VPN Concentrator communicates data to or from VPN User over the second connection, to or from the Target server over the Third connection, the VPN concentrator forming TCP packets for Second connection with the First Maximum Segment Size and Third connection with Second Maximum Segment Size, and wherein the VPN concentrator calculates independent Round Trip Time (RTT) for the Second connection and the Third connection.

In the described embodiment, the second connection 108 between VPN User 100 and VPN concentrator is a long distance connection, or a connection for sending large packets of data. The VPN user, during the TCP session, can request content from a plurality of Target servers. The VPN concentrator 102 initiates a corresponding number of connections to each of the plurality of Target servers 104.

The disclosed embodiment/concept/the disclosure also shows a method for data transmission over a virtual private network (VPN), the method comprising: establishing a VPN tunnel between the VPN user and the VPN concentrator; receiving, at a VPN concentrator, a first connection request from a VPN user to connect to at least one target server, each of the VPN user, the VPN concentrator and the at least one target server being remote to each other; establishing a second connection between the VPN user and the VPN concentrator in the VPN tunnel; determining, by the packet processing software within VPN concentrator, a first maximum segment size (MSS) for the second connection; establishing a third connection between the VPN concentrator and the target server; determining, by the VPN concentrator, a second MSS for the third connection; and transferring data between the second connection with the first MSS affecting formation of upstream and downstream packets, and the third connection with the second MSS affecting formation of downstream packets.

In the disclosed method, the transferring data comprises: receiving, at the VPN concentrator, a first data packet from the VPN user over the second connection; converting the first data packet, received from the VPN user, to a second data packet; and sending the second data packet to the target server over the third connection. The transferring data further comprises: receiving, at the VPN concentrator, a third data packet, sized according to the second MSS, from the target server over the third connection; converting the third data packet sized according to the second MSS, received from the target server, to a fourth data packet, sized to the first MSS; and sending the fourth data packet to the VPN user over the second connection. The at least one target server is located on the Internet.

In the disclosed method, the at least one target server comprises a plurality of target servers. A corresponding plurality of connections between the VPN concentrator and the plurality of target servers are established and determined a corresponding plurality of MSS parameter values of the plurality of connections between the VPN concentrator and the plurality of target servers, by the VPN concentrator. The second connection is a long distance connection, or comprises large data packets, or both.

The disclosed method comprises: determining at least one parameter for the second connection or the third connection, or both, wherein the at least one parameter includes a MSS, window size, a flag for managing the state of a connection, or a round trip time (RTT); and establishing, maintaining or closing at least one of the second connection or the third connection.

The disclose further describes an apparatus for data transmission over a virtual private network (VPN), the apparatus comprising: a VPN concentrator comprising: at least one processor, and a memory coupled to the at least one processor, the memory comprising computer executable instructions, which when executed using the at least one processor, performs a method comprising: establishing a VPN tunnel between the VPN user and the VPN concentrator, receiving, at the VPN concentrator, a first connection request from a VPN user to connect to at least one target server, each of the VPN user, the VPN concentrator and the at least one target server being remote to each other, establishing a second connection between the VPN user and the VPN concentrator in the VPN tunnel, determining, by the VPN user, a first maximum segment size (MSS) for the second connection, establishing a third connection between the VPN concentrator and the target server, determining, by the VPN concentrator, a second MSS for the third connection, and transferring data between the second connection with the first MSS and the third connection with the second MSS.

The transferring data comprises: receiving, at the VPN concentrator, a first data packet from the VPN user over the second connection; converting the first data packet received from the VPN user, to a second data packet; and sending the second data packet to the target server over the third connection.

The apparatus wherein the method further comprises: determining at least one parameter for the second connection or the third connection, or both, wherein the at least one parameter includes a MSS, window size, a flag for managing the state of a connection, or a round trip time (RTT); and establishing, maintaining or closing at least one of the second connection or the third connection.

The disclosed apparatus targets at least one target server located on the Internet. At least one target server comprises a plurality of target servers, and wherein the method comprises: establishing a corresponding plurality of connections between the VPN concentrator and the plurality of target servers; and determining, by the VPN concentrator, a corresponding plurality of MSS of the plurality of connections between the VPN concentrator and the plurality of target servers. The VPN tunnel is a network layer (Layer 3 of the OSI model) connectivity instance.

The VPN concentrator 102 may be a general-purpose computer or other electronic processing device that is programmed to be a specific purpose computer to perform functions related to embodiments of the present invention. The VPN concentrator 102 comprises a CPU, support circuits, and a memory containing instructions and algorithms. The CPU may be any commercially available processor, microprocessor, microcontroller, and the like. The support circuits comprise well-known circuits that provide functionality to the CPU such as a user interface, clock circuits, network communications, cache, power supplies, I/O circuits, and the like. Alternative embodiments may use control algorithms on a custom Application Specific Integrated Circuit (ASIC) to provide the functionality provided by the any combination of the CPU, the support circuits and the memory. In some embodiments, the user interface comprises a keypad, electronic buttons, speaker, touchscreen, display, or other user interaction mechanism.

The memory may be any form of digital storage used for storing data and executable software. Such memory includes, but is not limited to, random access memory, read only memory, disk storage, optical storage, and the like. The memory stores computer readable instructions corresponding to an operating system, and a packet processing software. The packet processing software includes computer executable instructions, which upon execution at the VPN concentrator, perform and/or enable the various techniques described herein.

The VPN user 100 and the target server 104 may be similar general-purpose computer or electronic processing devices as the VPN concentrator, and include, for example, personal computers, server class machines, mobile computers, tablets, smartphones, and the like. The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having the benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations, and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A method, comprising:
   establishing an encrypted tunnel between a virtual private network (VPN) server and a VPN user device;
   receiving via the encrypted tunnel a request from the VPN user device to establish a connection with a target device, wherein the request includes a desired connection parameter that is to be negotiated between the VPN user device and the target device;
   selecting a first connection parameter for a first connection between the VPN user device and the VPN server;
   converting the connection into the first connection and a second connection between the VPN server and the target device;
   transmitting the first connection parameter to the VPN user device, wherein the VPN user device uses the first connection parameter for transmitting network packets to the target device;
   negotiating a second connection parameter for data exchange over the second connection between the VPN server and the target device;
   converting first network packets received from the VPN user device according to the first connection parameter into second network packets according to the second connection parameter; and
   transmitting the second network packets to the target device.

2. The method of claim 1, wherein the first connection parameter comprises a first maximum segment size (MSS) and the second connection parameter comprises a second MSS that is different from the first MSS.

3. The method of claim 2, wherein the first MSS is selected to prevent packet fragmentation that is due to VPN-related encapsulation overhead.

4. The method of claim 3, wherein packets sent over the first connection and the second connection are of a same standard transfer unit size.

5. The method of claim 1, wherein respective payloads of the first network packets are smaller than respective payloads of the second network packets.

6. The method of claim 1, further comprising:
setting the second connection parameter based on a distance between the VPN server and the target device.

7. The method of claim 1, wherein the first network packets include VPN encapsulation headers that are not included in the second network packets.

8. A virtual private network (VPN) server, comprising:
a processor configured to execute instructions to:
establish an encrypted tunnel between the VPN server and a VPN user device;
receive via the encrypted tunnel a request from the VPN user device to establish a connection with a target device, wherein the request includes a desired connection parameter that is to be negotiated between the VPN user device and the target device;
select a first connection parameter for a first connection between the VPN user device and the VPN server;
convert the connection into the first connection and a second connection between the VPN server and the target device;
transmit the first connection parameter to the VPN user device, wherein the VPN user device uses the first connection parameter for transmitting network protocol data units to the target device;
negotiate a second connection parameter for data exchange over the second connection between the VPN server and the target device;
convert first network protocol data units received from the VPN user device according to the first connection parameter into second network protocol data units according to the second connection parameter; and
transmit the second network protocol data units to the target device.

9. The VPN server of claim 8, wherein the first connection parameter comprises a first maximum segment size (MSS) and the second connection parameter comprises a second MSS that is different from the first MSS.

10. The VPN server of claim 8, wherein the instructions to convert the connection into the first connection and the second connection between the VPN server and the target device comprise instructions to:
determine to convert the connection into the first connection and the second connection based on a distance between the VPN user device and the target device.

11. The VPN server of claim 9, wherein the first MSS is selected to prevent fragmentation that is due to VPN-related encapsulation overhead.

12. The VPN server of claim 8, wherein the network protocol data units sent over the first connection and the second connection are of a same standard transfer unit size.

13. The VPN server of claim 8, wherein respective payloads of the first network protocol data units are smaller than respective payloads of the second network protocol data units.

14. The VPN server of claim 8, wherein the processor is further configured to execute instructions to:
set the second connection parameter based on a distance between the VPN server and the target device.

15. The VPN server of claim 8, wherein the first network protocol data units include VPN encapsulation headers that are not included in the second network protocol data units.

16. A non-transitory computer readable medium storing instructions operable to cause one or more processors to perform operations comprising:
establishing an encrypted tunnel between a virtual private network (VPN) server and a VPN user device;
receiving via the encrypted tunnel a request from the VPN user device to establish a connection with a target device, wherein the request includes a desired connection parameter that is to be negotiated between the VPN user device and the target device;
selecting a first connection parameter for a first connection between the VPN user device and the VPN server;
converting the connection into the first connection and a second connection between the VPN server and the target device;
transmitting the first connection parameter to the VPN user device, wherein the VPN user device uses the first connection parameter for transmitting network packets to the target device;
negotiating a second connection parameter for data exchange over the second connection between the VPN server and the target device,
converting first network packets received from the VPN user device according to the first connection parameter into second network packets according to the second connection parameter; and
transmitting the second network packets to the target device.

17. The non-transitory computer readable medium of claim 16, wherein the first connection parameter comprises a first maximum segment size (MSS) and the second connection parameter comprises a second MSS that is different from the first MSS.

18. The non-transitory computer readable medium of claim 17, wherein the first MSS is selected to prevent packet fragmentation that is due to VPN-related encapsulation overhead.

19. The non-transitory computer readable medium of claim 16, wherein packets sent over the first connection and the second connection are of a same standard transfer unit size.

20. The non-transitory computer readable medium of claim 16,
wherein respective payloads of the first network packets are smaller than respective payloads of the second network packets, and
wherein the first network packets include VPN encapsulation headers that are not included in the second network packets.

* * * * *